April 20, 1937.    C. B. MOORE    2,077,803
SIGNBOARD THERMOMETER
Filed May 9, 1934    3 Sheets-Sheet 1

INVENTOR.
COLEMAN B. MOORE,
BY John E. Hubbell
ATTORNEY

April 20, 1937.  C. B. MOORE  2,077,803
SIGNBOARD THERMOMETER
Filed May 9, 1934  3 Sheets-Sheet 3

INVENTOR.
COLEMAN B. MOORE,
BY John E. Hubbell
ATTORNEY

Patented Apr. 20, 1937

2,077,803

UNITED STATES PATENT OFFICE 2,077,803

SIGNBOARD THERMOMETER

Coleman B. Moore, Carroll Park, Pa., assignor to The Brown Instrument Company, Philadelphia, Pa., a corporation of Pennsylvania Application May 9, 1934, Serial No. 724,714

10 Claims. (Cl. 73—52)

The general object of the present invention is to provide an indicating meter with novel and effective means for giving the meter pointer or analogous indicating element movements in correspondence with changes in value of a quantity or condition measured by the measuring or meter element without requiring the latter to supply the power used in giving the indicating element its movement.

While not restricted to such use, the invention was primarily devised and is especially adapted for use in connection with an outdoor display or advertising bulletin or sign board to indicate atmospheric or other temperatures, pressures or the like and to exhibit the measurements on a scale of much greater magnitude than is employed in ordinary indicating meters so that the measurements may be read easily by an observer at a considerable distance from the meter pointer. For example, in the case of a meter located over a bulding the pointer and scale may be so proportioned that the existing temperature, pressure or other variable is plainly visible from a distance of several hundred yards or more, and in a boiler room of ordinary size, the meter pointer and scale are advantageously made large enough so that the meter indications may be easily read by a boiler attendant when in any portion of the boiler room normally occupied by him.

The various features of novelty which characterize the invention are pointed out with particularity in the claims annexed to and forming a part of this invention. For a better understanding of the invention, however, its advantages and specific objects obtained with its use, reference should be had to the accompanying drawings and descriptive matter in which I have illustrated and described a preferred embodiment of the invention.

Figure 1:
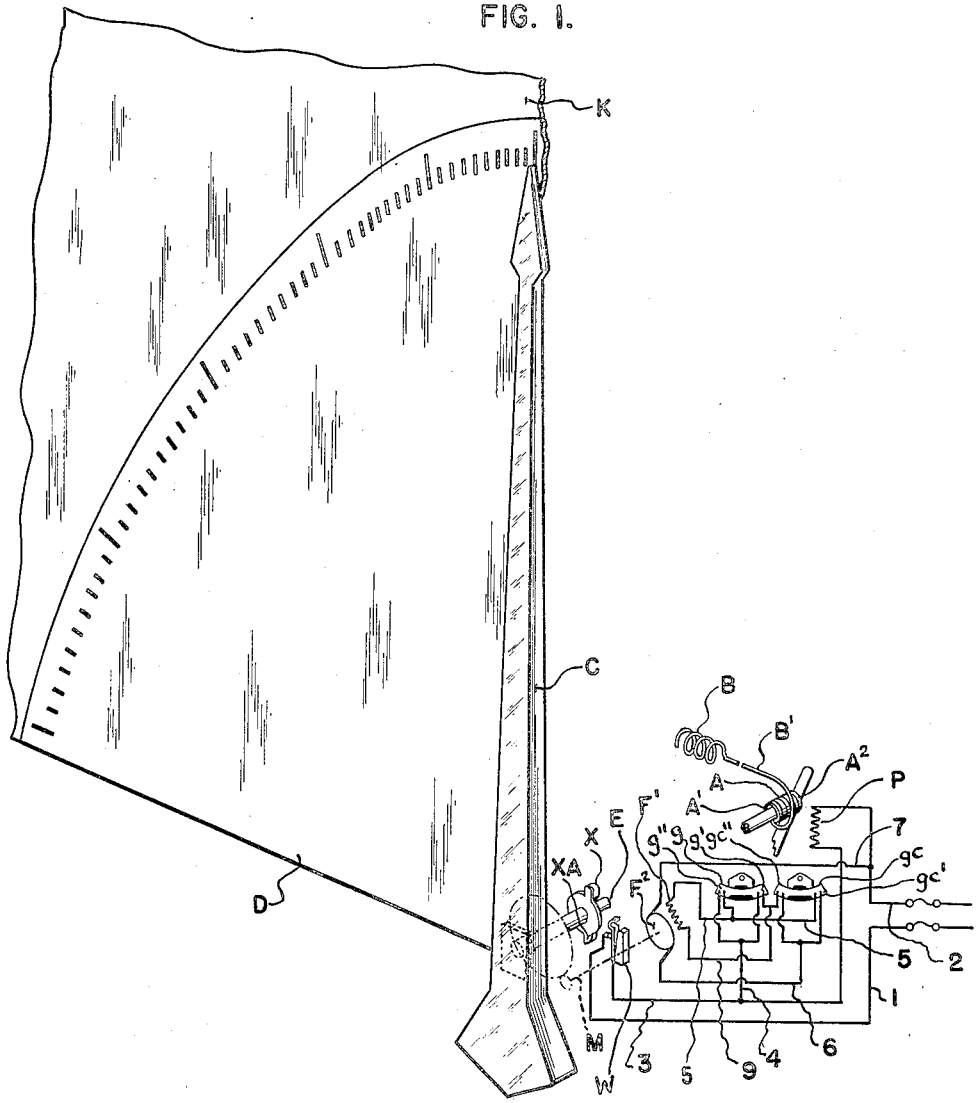
Fig. 1 is a somewhat diagrammatic showing of the meter mechanism and electrical wiring therefor.

The embodiment of the invention illustrated by way of example in the drawings was primarily devised for use as a so-called signboard thermometer, and comprises a meter element proper in the form of a Bourdon tube helix A having one end A' connected by a tube or pipe B' to a bulb B subjected to the temperature to be measured and containing a fluid which changes in volume and thereby varies the fluid pressure in the helix A as the temperature of the bulb B varies. Changes in the pressure within the helix produces relative rotative movements about the helix axis of the two ends A' and A² of the helix. The invention is characterized by the means provided for causing the relative movements of the helix ends to produce corresponding movements of the long meter pointer C along a corresponding elongated scale D. For its intended use, the pointer C will ordinarily be several feet in length, whereas the Bourdon tube helix A may be only an inch or two in diameter and altogether too small and delicate to furnish the power required to give the long pointer its necessary movements.

In the form of construction shown, the helix A is supported by and is coaxial with and has its end A' in fixed angular relation with a rotatable shaft E which carries the pointer C, so that the pressure changes within the helix due to changes in the temperature to which the bulb B is subjected, move the helix end $a^2$ relative to the shaft E angularly about the axis of said shaft. In accordance with the present invention, the end $A^2$ of the helix is normally maintained in a predetermined or normal position fixed with respect to the stationary parts of the meter structure, and when displaced from that position, the end $A^2$ effects the energization of a relay mechanism, shown as including an electric motor F geared to the shaft E, whereby the latter is rotated to return the helix end $A^2$ to its normal position, and to correspondingly adjust the pointer C.

In the form shown, the relay motor F is energized for operation in the proper direction and de-energized accordingly as the helix end $A^2$ is displaced in one direction or the other from, or is in its normal position, through a motor controller collectively designated by the symbol G which includes a reciprocating actuating lever feeler H pivoted at H' and having three operative positions determined by the engagement of an actuating part $H^2$ of the lever with one or another of two shoulders I' and $I^2$, formed at the end of a counter-balanced arm I or by failure of part $H^2$ to engage lever I when the latter has rotated clockwise beyond the province of part $H^2$. Lever I is freely journaled on a pivot $I^4$ coaxial and supported by the adjacent end of the shaft E. The arm I is angularly adjusted about its pivotal axis $I^4$ in accordance with the angular position of the helix end $A^2$ which engages connecting means $I^5$ carried by the arm I.

In the particular arrangement shown, the shoulder $I^2$ is less remote than the shoulder $I'$ from the pivot pin $I^4$ and helix axis. When the helix end $A^2$ occupies its normal position, the shoulder $I^2$ is in position for engagement by the part $H^2$ of the lever H. When the temperature of the bulb B and the pressure within the helix A increase above their normal values and the helix end $A^2$ is shifted from its normal position in the counter-clockwise direction as seen in Fig. 2, the arm I is adjusted into the position in which the part $H^2$ may engage with the shoulder $I'$, and when the bulb temperature and the pressure of the fluid in the helix decrease below their normal values, the resultant change in position of the helix end $A^2$ shifts the arm I in the clockwise direction as seen in Fig. 2, so that the lever I is not in position for engagement with the part $H^2$ of the lever H.

Figure 2:
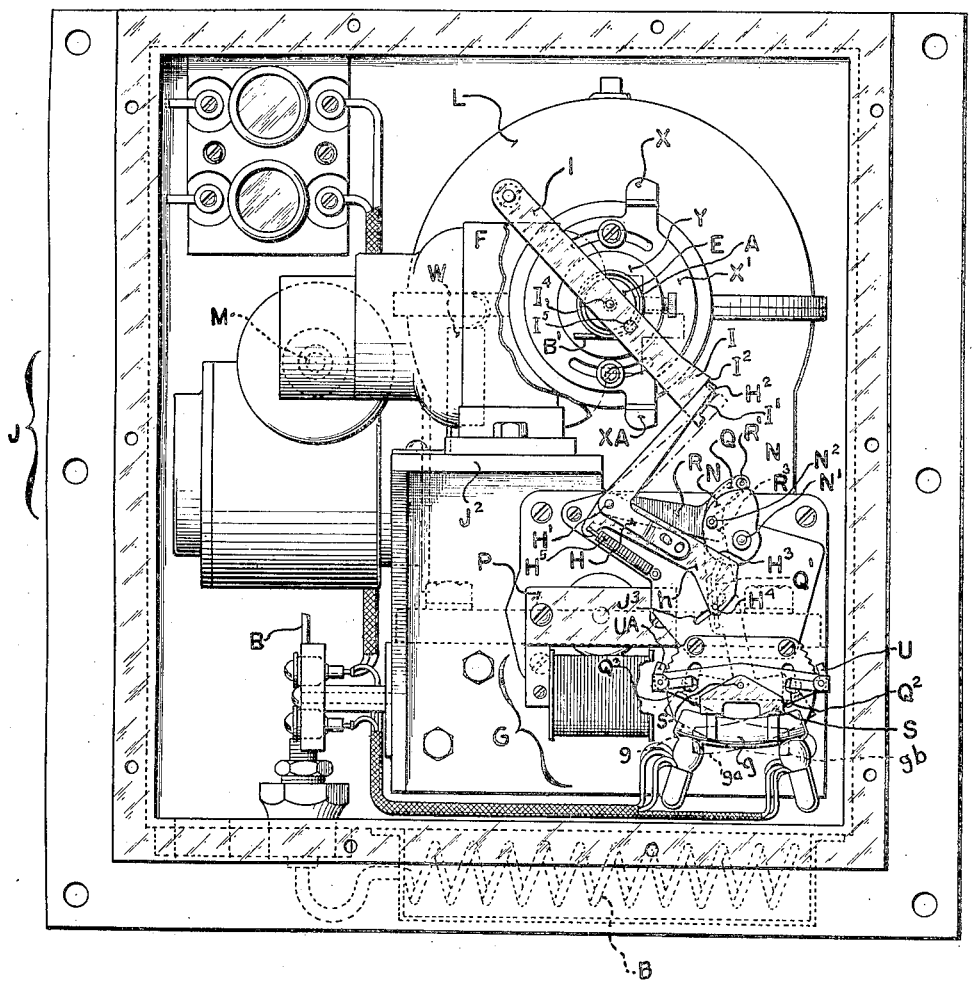
Fig. 2 is a rear elevation of the meter mechanism shown diagrammatically in Fig. 1, with a portion of the meter casing removed.
Figure 3:
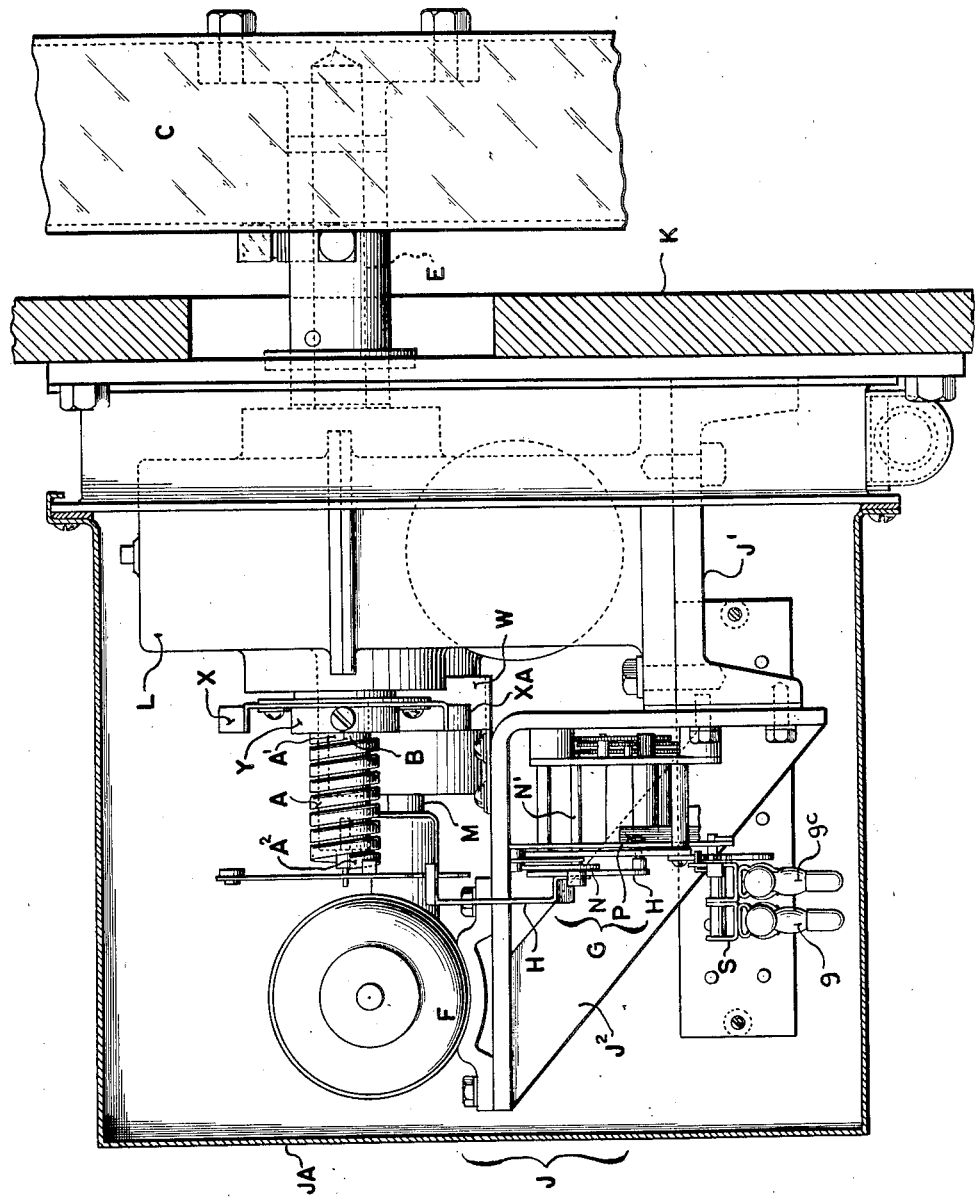
Fig. 3 is a side elevation of the meter mounted on a panel or supporting structure with some of the parts shown in section and broken away.

With the form of meter instrument construction shown in Figs. 2 and 3, all of the mechanism parts shown diagrammatically in Fig. 1, except the pointer C, scale D, a portion of the tube B' and the bulb B, are located within a housing or casing comprising a body member J, and a removable casing cover part JA. As shown, the casing body J is in the form of a shallow box open at one side and adapted for attachment to a support K against which the closed side of the box-like body bears, and the support K is in the form of a vertical panel or wall through which the shaft E extends. The support K forms the signboard or dial of the meter and the scale D along which the pointer C sweeps is marked on or carried by the side of the support K remote from the casing body J.

The shaft E is journalled in a housing L which is supported on a bracket J' carried by the member J, and which constitutes the enclosure of a reducing gear unit driven by the motor F through a counter shaft M. As the armature speed of the motor F is advantageously very much higher than the speed of the shaft E, the motor F may advantageously be of a type including a speed-reducing gear connection between the armature shaft of the motor and the counter shaft M. As such motors are well-known and as the reducing gear unit enclosed by the housing L may be of well-known type, it is unnecessary to describe them in detail. The motor F is shown as mounted on the horizontal portion of bracket $J^2$ having a vertical portion secured to the end of the bracket extension J'. The bracket $J^2$ also forms a support for the motor controller G.

The controller G in the form shown in Fig. 2 and Fig. 3 includes a pair of mercury switches $g$ and $gc$ and means for adjusting them together into one of three operative positions accordingly as one or another of the shoulders $I'$ and $I^2$ of the lever I is in position for engagement by the part $H^2$ of the lever H or the lever I is not engaged by lever H. As shown, the lever H is periodically moved to swing its part $H^2$ away from the axis of the shaft E during one portion of each revolution of a constantly rotating cam member N, through a roller carried eccentrically by the cam N and engaging a suitably shaped edge portion $H^3$ of a part $h$ rigidly but adjustably secured to the body portion of the lever H. During another portion of each revolution of the cam N, the lever H is permitted to rotate counter-clockwise under the action of a spring $H^5$, until its movement is arrested by one or the other of the shoulders $I'$ and $I^2$, or by the engagement of the pin $H^4$ with the upper end of the slot $J^3$, as hereinafter described. The cam N is carried by a cam shaft N' driven by a constantly running motor P, which may be of any of the types commonly employed for instrument timing purposes.

In each of its revolutions, the cam N gives a rising and falling movement to a member Q by which the position of the switches $g$ and $gc$ are adjusted. As shown, the member Q is pivotally connected by a pivot pin R' to a member R pivotally connected at H' to the instrument framework. The pivot pin R' bears, or forms the axle for a cam roller riding on the edge of the cam N, and the member R serves in effect as a radius rod guiding the upper end of the member Q in its up and down movements. As shown, the cam N has a cam projection $N^2$ which engages a shoulder of edge portion $R^3$ of the member R during a portion of each revolution of the cam N and thereby insures the corresponding falling movement of the member Q. The path of upward movement of the lower end of the member Q is selectively dependent on the position in which lever H terminates its counter-clockwise rotation by co-operation with lever I. To this end in the construction shown, the part $h$ of the lever H carries a transverse stud or shaft $H^4$ which extends through a cam slot Q' formed in a lower portion of the member Q.

The switches $g$ and $gc$ are each secured to a switch carrier S which is pivotally mounted on pin S' attached to the bracket $J^2$ and adapted to support the switches in the full line position shown in Fig. 2 or in one or the other of its two dotted line positions, $ga$ and $gb$, shown in Fig. 2, following the adjustment of the switches into one or another of said positions by the action of the member Q. As shown, the switch-supporting means include a clutch or locking part U normally preventing adjustment of the switch carrier S in a clockwise direction, such adjustment being required for the adjustment of the switch from its dotted line position $gb$ into its full line position, and from the latter position into the dotted line position $ga$, and includes a second clutch or locking part UA which similarly tends to prevent counter-clockwise adjustments of the switch carrier.

When the part $H^2$ of the lever H is in engagement with the shoulder $I'$ as a rising movement of the member Q occurs, the path of movement of the latter is such as to move a part $Q^3$ carried at the lower end of the member Q into releasing engagement with the locking part UA, and as the rising movement of the part $Q^3$ continues, it acts on the switch carrier S to shift the latter to move the switches into the dotted line position $gb$, unless the switches are already in that position. In the latter case, the rising movement of the part $Q^3$, while temporarily releasing the locking part UA does not operatively change the position of the switches. When the part $H^2$ of the lever H does not engage lever I, its counter-clockwise movement is terminated by engagement of pin $H^4$ with the end of slot $J^3$, and, when a rising movement of the member Q occurs with pin $H^4$ in this position, a part $Q^2$ carried at the lower end of the member Q engages and releases the locking part U and shifts the member S into the dotted line position $ga$, unless the switches already occupy that position. With the part $H^2$ of the lever H in engagement with the normal position shoulder $I^2$ of the arm I, when a rising movement of the member Q occurs, the parts $Q^3$ and $Q^2$, respectively, engage and release the two locking parts U and UA and adjust the switches into the full line position unless the latter already occupy that position. On descending movements of the member Q, the locking parts U and UA return to their normal locking positions. No claim is made herein on the form of the motor controller G disclosed, as it did not originate with me, but is the invention of Frederick W. Side and forms the subject matter of his application for patent, Serial No. 661,293, filed March 7, 1933.

The switches g and gc are each shown as comprising a suitably shaped glass envelope containing a body of mercury and into one end of which extend a pair of switch contacts g' and gc' respectively and into the other end of which extend a pair of switch contacts g'' and gc'', respectively, the mercury being shifted to connect the switch contacts g' and gc' when the switch occupies its dotted line position ga, and to connect the switch contacts g'' and gc'' when the switch occupies its dotted line position gb, and to connect the contacts of neither pair when the switch g occupies its full line position shown in Fig. 2. With the circuit arrangement illustrated diagrammatically in Fig. 1, when the switches are in the dotted line position ga (of Fig. 2), the series wound single field motor F is normally energized for operation in the direction to rotate the shaft E in the clockwise direction (Fig. 1) by a circuit which includes a supply conductor 1, normally closed limit switch W, a conductor 3, conductor 4, contacts g' of switch g, field F' of motor F, conductor 5, contacts gc' of switch gc, conductor 6, armature $F^2$ of motor F, and conductor 7 to the opposite side of the line 2. When the switch g occupies its dotted line position gb, the closure of switch contacts g'' connects the supply conductor 1 to field F' through conductor 5, and the opposite terminal of field F' is connected by conductor 9 through then closed contacts gc'' of switch gc, conductor 6, armature $F^2$ and conductor 7 to line 2, and the motor F is then energized to rotate the shaft E in the counter-clockwise direction. Although a single field motor is herein shown, I may use a double field reversible motor employing a single mercury switch in place of switches g and gc for energizing such motor in one direction or the other.

The limit switch W serves, as those skilled in the art will understand, to prevent movement of the shaft E and pointer C in either direction beyond the corresponding limit of their normal range of movement. As shown, the limit switch W is mounted on the bracket part $J^2$ and is actuated by projections X and XA, respectively, of a limit switch actuating member X' which is adjustably attached to a hub or collar part Y secured to the shaft E. The helix A has its end A' secured to said collar Y which forms the immediate support for the helix. With the described arrangement Fig. 1, when the shaft E reaches the normal limit of its movement in the clockwise direction, the projection X opens the limit switch W and thereby positively prevents further movement of the shaft E in the clockwise direction. Conversely, when the shaft E reaches the normal limit of its movement in the counter-clockwise direction, the projection XA engages and opens the limit switch W and prevents further movement of the shaft E in the counter-clockwise direction. The circuit connection to motor F is likewise broken when limit switch W is opened.

As shown, the tube B', or at least the portion of the tube adjacent its connection to the helix end A' is flexible and so disposed that the normal range of angular movement of the helix end A' may occur without injury to the portion of the tube B' connected thereto. The fact that some power may be required to bend the portion of the tube B' connected to the helix end A', as required to accommodate the angular movement of the latter, does not interfere with the measuring accuracy or sensitivity of the helix, since that power is furnished by the motor F, which effects the bodily adjustment of the shaft E and helix A.

As those skilled in the art will understand, moreover, the meter mechanism shown may be designated and adjusted so that the helix A is subjected to no objectionable or significant stress as a result of the provisions through which the position of the helix end $A^2$ acts through its positioning action of the lever H to selectively control the operation of the motor controller G. While each engagement of the lever H with the arm I may tend to hold the helix end $A^2$ against movement during that period of engagement, it is practically feasible to make each such period so short and to so minimize the magnitude of the maximum movement which the helix end $A^2$ would have during such period if unrestrained, that the restraint due to the engagement can not subject the helix to objectionable stress. The maximum extent of movement thus prevented by the engagement of the lever H and arm I is determined, of course, by the maximum extent change in the fluid pressure within the helix which can occur during any one period of engagement, and may be made as small as conditions make desirable, by correspondingly decreasing the duration of the period of engagement, which in an instrument of this character need never exceed a small fraction of a minute.

As those skilled in the art will understand, it is not necessary that the lever H and arm I should co-operate to make each angular adjustment of the shaft E effected by the motor F exactly that required to compensate for the displacement of the helix end $A^2$ from its normal position at the time. The accuracy obtainable with the use of the simple arrangement including arm I having two shoulders I' and $I^2$, as shown, permits of all the measurement accuracy required in a meter of the type disclosed. With the particular form of arrangement shown, the speed of adjustment of the pointer C produced by the rotation of the motor F should be slightly higher than that corresponding to the maximum rate of change in the fluid pressure within the helix which can be expected to occur under any normal condition of operation.

To avoid hunting difficulties, the angular length of the shoulder $I^2$ may advantageously be made a trifle greater than the angular movement imparted to the shaft E between two successive engagements of the lever H and arm I. While this tends to a slight theoretical lack of measurement precision, the error which it introduces is small and insignificant and is more than compensated for by its effect in preventing erroneous adjustments of the shaft E under certain conditions which may occasionally exist.

In the construction illustrated and described, the helix A forms a meter element of which the helix end $A^2$ is a deflecting part, which is attached to and bodily movable with the portion of an indicating member formed by the shaft E, and the motor F with its controller G forms a relay mechanism which is actuated by the deflection of the deflecting part of the meter element, away from a predetermined position to move said members as required to return the deflecting part of said position. As will be readily apparent, the principles of the invention, and the general features of the embodiment disclosed, are not restricted to use in a meter of which the meter element proper is a Bourdon tube helix with one end of the helix serving as the deflecting part of the meter element.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent is:

1. In an indicating meter, the combination with a movable indicating member, a meter element attached to said member for bodily movement with the latter and including a part deflectable from a normal position relative to said member in accordance with a force governed by the changes in the value of the quantity measured, and a relay mechanism actuated by the deflection of said part away from said normal position of the latter to move said member in the direction to return said part to said normal position independently of said force.

2. In an indicating meter, the combination with an indicating member rotatable about an axis, a meter element attached to said indicating element and for bodily rotation with the latter and including a part deflectable from a normal position about said axis relative to said member in accordance with changes in the value of the quantity measured, and a relay mechanism actuated by the deflection of said part away from said normal position to rotate said member in the direction to return said part to said normal position.

3. In an indicating meter, the combination with a movable indicating member, a meter element attached to said member for bodily movements with the latter and including a part deflectable from a predetermined position relative to said member in accordance with a force which is governed by changes in the value of the quantity measured and is unaffected by the changes in position of said member, and a relay mechanism selectively actuated periodically in accordance with the deflection of said part in either direction from said predetermined position to move said member in the direction to return said part to said position.

4. In an indicating meter, the combination with an indicator shaft, of a Bourdon tube helix coaxial with and having one end attached to said shaft and having its other end deflectable from a predetermined position angularly about the axis of said shaft in correspondence with changes in the fluid pressure within said helix, a relay mechanism adapted to rotate said shaft and including a control element co-operating with said other end of the helix when the latter is deflected in either direction from said predetermined position, to selectively energize said relay mechanism for rotation of said shaft in the direction required to turn said other end of the helix back into said predetermined position.

5. A signboard meter comprising a casing adapted for attachment to the rear side of a wall formed with an aperture, a shaft journalled in said casing and having one end extending through said aperture and supporting a pointer adapted to co-operate with a scale carried at the front side of said wall, a meter element attached to and bodily rotatable with said shaft and including a part deflectable from a predetermined position angularly about the axis of said shaft in accordance with changes in value of a quantity measured, and relay mechanism for rotating said shaft and including a control member co-operating with said deflecting part on a deflection of the latter away from said predetermined position to selectively energize said relay mechanism for rotation of said shaft in the direction required to return said part to said position.

6. The combination with a member rotatable about an axis, of an element mounted on said member for rotation therewith and for independent rotation about said axis relative to said member in response to changes in a variable condition, and relay means controlled by the rotation of said element away from a predetermined position of the latter for rotating said member to return said element to said position.

7. The combination with a measuring system including an element deflectable from a predetermined normal position in accordance with the changes in the measured condition, a feeler adapted to be moved away from said element and toward said element into a position depending on the deflection of the latter, a member, independent of said measuring system, to be actuated in accordance with the deflection of said element, relay mechanism controlled by said feeler for actuating said member, and means actuated with said member for restoring said element to said normal position.

8. The combination with a measuring system including an element deflectable from a predetermined normal position in accordance with changes in a variable condition, a feeler adapted to be moved away from said element and toward said element into a position depending on the deflection of the latter, a member independent of said measuring system to be actuated in accordance with the deflection of said element, a reversible electric motor to control said member, switches to selectively energize said motor in one direction or the other over circuits independent of said feeler, power actuated mechanism controlled by said feeler for actuating said switches, and means controlled by said motor for restoring said element to said normal position.

9. The combination with a measuring system including an element deflectable from a predetermined normal position in accordance with changes in a variable condition, a feeler adapted to be moved away from said element and toward said element into a position depending on the deflection of the latter, a member independent of said measuring system to be actuated in accordance with the deflection of said element, a reversible electric motor to control said member, switches to selectively energize said motor in one direction or the other over circuits independent of said feeler, power actuated mechanism controlled by said feeler for actuating said switches, and circuit breaking means controlled by said motor to limit the maximum movement thereof.

10. In an indicating meter, the combination with a movable indicating member, a meter element mounted on and carried solely by said member for bodily movement with the latter, and including a part deflectable from a normal position relative to said member in accordance with changes in the value of the quantity measured, and a relay mechanism actuated by the deflection of said part away from said normal position of the latter to move said member in the direction to return said part to said normal position.

COLEMAN B. MOORE.